(12) United States Patent
Moll et al.

(10) Patent No.: US 10,213,717 B2
(45) Date of Patent: Feb. 26, 2019

(54) DEVICE FOR INTRODUCING A FLUID MEDIUM INTO A CONTAINER

(71) Applicant: LINDE AKTIENGESELLSCHAFT, München (DE)

(72) Inventors: Anton Moll, Raisting (DE); Christian Matten, Pullach (DE); Michael Baus, Gräfelfing (DE); Daniela Lauchner, Meitingen (DE); Manfred Ehrnsperger, München (DE)

(73) Assignee: Linde Aktiengesellschaft, Munich (DE)

( * ) Notice: Subject to any disclaimer, the term of this patent is extended or adjusted under 35 U.S.C. 154(b) by 150 days.

(21) Appl. No.: 15/304,914

(22) PCT Filed: Apr. 23, 2015

(86) PCT No.: PCT/EP2015/000844
§ 371 (c)(1),
(2) Date: Oct. 18, 2016

(87) PCT Pub. No.: WO2015/165578
PCT Pub. Date: Nov. 5, 2015

(65) Prior Publication Data
US 2017/0182440 A1   Jun. 29, 2017

(30) Foreign Application Priority Data

Apr. 30, 2014   (EP) .................................. 14001529

(51) Int. Cl.
*B01D 45/08*   (2006.01)
*B01D 3/00*   (2006.01)
*B01D 19/00*   (2006.01)

(52) U.S. Cl.
CPC ............. *B01D 45/08* (2013.01); *B01D 3/008* (2013.01); *B01D 19/0042* (2013.01)

(58) Field of Classification Search
None
See application file for complete search history.

(56) References Cited

U.S. PATENT DOCUMENTS

| 2001/0038156 A1 | 11/2001 | Mcewan |
| 2008/0168753 A1 | 7/2008 | Christiansen et al. |
| | (Continued) | |

FOREIGN PATENT DOCUMENTS

| DE | 102011122014 A1 | 6/2013 |
| WO | WO 2004035187 A2 | 4/2004 |

OTHER PUBLICATIONS

DE 102011122014 Espacenet Translation accessed May 26, 2018 (Year: 2018).*

*Primary Examiner* — Amber R Orlando
*Assistant Examiner* — Brit E. Anbacht
(74) *Attorney, Agent, or Firm* — Philip H. Von Neida

(57) ABSTRACT

A device for introducing fluid medium into a container, the device including a container for receiving the medium and a pipeline for introducing the medium into the interior of the container. The pipeline has a pipeline section arranged in the interior of the container having a hollow cylindrical casing that extends along a cylinder axis of the pipeline section. The casing has an opening on a lower face that faces downward for introducing the fluid medium into the interior of the container. The opening includes two first edge portions extending along the cylinder axis and two opposing arc-shaped second edge portions that connect the two first edge portions to each other. A plate-shaped impact element is fixed to the casing and arranged below the opening so that the fluid medium that flows out of the opening strikes the impact element.

18 Claims, 3 Drawing Sheets

(56) References Cited

U.S. PATENT DOCUMENTS

2010/0276821 A1    11/2010   Lee et al.
2012/0080105 A1     4/2012   Bambara
2016/0356011 A1*   12/2016   Wendorff .............. E01H 10/007

* cited by examiner

DEVICE FOR INTRODUCING A FLUID MEDIUM INTO A CONTAINER

CROSS REFERENCE TO RELATED APPLICATIONS

This application claims priority from PCT Application PCT/EP2015/00844, filed on Apr. 23, 2015 which claims priority from European Patent Application EP 14001529.8, filed on Apr. 30, 2014.

BACKGROUND OF THE INVENTION

The invention relates to a device for introducing a fluid medium into a container according to claim 1.

Such a device or arrangement has a container, which defines an interior of the container for receiving the medium, which may be a stream of a single-phase or two-phase substance, that is to say for example a stream of a liquid or gaseous substance or a stream of a substance that has both a liquid phase and a gaseous phase. The device also has a pipeline for introducing the medium into the interior of the container, the pipeline having a pipeline portion, which is arranged in the interior of the container, and having a hollow-cylindrical casing, which extends along a cylinder axis. The casing has—with respect to a container arranged as intended—on a downwardly facing underside an opening for introducing the fluid medium into the interior of the container, that opening being delimited by two first edge portions of the casing that are made to extend along the cylinder axis and two arcuate second edge portions of the casing that lie opposite one another and in the direction of the cylinder axis, those arcuate second edge portions connecting the two first edge portions to one another.

Such a device serves the purpose firstly of distributing the gaseous fraction of the medium as uniformly as possible over the free cross section of the container (for example a separator or a column) and secondly of accomplishing a pre-separation of the liquid phase.

Against this background, the present invention is based on the object of further improving such a device, to be precise in particular in such a way that a liquid sump of the container is protected to guard against already separated liquid being torn out again.

This object is achieved by a device as described herein. Advantageous refinements are also described.

SUMMARY OF THE INVENTION

According to the invention one, two or more plate-shaped first directing elements are present, which element or elements respectively extend perpendicularly in relation to the cylinder axis and proceed from an upper side of a baffle element that is facing the opening and project through that opening into the interior of the pipeline portion or into that opening. In this way, the baffle element or the opening is divided into a number of segments, each of which can be charged with the stream of substance or medium. When there is only one first directing element, a division into two segments is realized, when there are two first directing elements, on the other hand, a division into three segments, and so on. The baffle element is plate-shaped and is arranged underneath the openings on the casing, so that fluid medium emerging from the opening strikes the baffle element.

The baffle element therefore diverts the medium to be introduced, in particular the gaseous phase, away and thereby protects the liquid sump from being impinged by the medium or that gaseous phase unhindered, so that tearing out of already separated liquid from the sump is counteracted. The baffle element is preferably a flat, preferably planar, and preferably rectangular element or plate (known as a baffle plate), which particularly preferably lies in a horizontal plane.

A typical distance from the middle or cylinder axis of the pipeline portion along the vertical to the baffle element is preferably 0.5 times to 2 times, preferably 0.6 times to 1 times, most preferably 0.7 times to 0.8 times, the inside diameter of the pipeline portion.

The two first edge portions preferably run at least in certain portions or entirely parallel to the cylinder axis. It is conceivable that the two first edge portions have for example a step and in particular otherwise run parallel to the cylinder axis.

It is preferably also provided that the two second edge portions are formed as arcs of a circle, to be precise preferably as arcs of a semicircle, those second edge portions preferably respectively extending in a plane of extent oriented perpendicularly in relation to the cylinder axis.

In one embodiment, the two first edge regions may for example be formed in a linear manner (as a straight line) and the two second edge regions may be formed in a semicircular manner. This means that the opening is formed by removing one half of the casing in the region of the opening. In other words, the upper side of the casing lying opposite the opening forms a half-tube. An embodiment in which the opening directly adjoins a cover that closes the pipeline portion fluid-tightly at its free end is also possible.

The container may in principle be of any desired design. In particular, the container may be an upright container, the longitudinal or cylinder axis of which is aligned along the vertical, or for example a lying container, the longitudinal or cylinder axis of which is aligned along the horizontal.

According to one embodiment of the invention, it is also provided that, with respect to a container arranged as intended, the cylinder axis runs parallel to the horizontal.

According to a preferred embodiment of the invention, it is also provided that, along the horizontal, to be precise in particular perpendicularly in relation to the cylinder axis of the casing, the baffle element projects beyond the opening or the casing. In this way it can be achieved that a large part of the medium emerging from the opening initially flows against the baffle element and is correspondingly diverted away.

According to a preferred refinement of the invention, it is provided that the baffle element is fixed to the casing by way of at least two walls, which respectively project from the underside of the casing. These two walls preferably lie opposite one another in the direction of the cylinder axis of the casing and preferably run parallel to one another. The walls preferably lie respectively in a vertical plane.

Particularly preferably, a droplet separator, particularly in the form of a knitted mesh (for example of wire), is provided in the region of the opening on each of two opposite sides of the pipeline portion. In the case of such droplet separators, the greater inertia of liquid droplets in comparison with the gaseous phase is utilized by the two-phase medium (liquid/gaseous) being conducted in such a way that the direction of flow is repeatedly changed. The liquid droplets cannot follow these changes in direction, impinge on the separator and are therefore deposited on the separator.

The baffle element, the two walls and the casing or the two channels (see below) preferably delimit in each case a lateral opening of the device, those two lateral openings lying opposite one another (the opening is arranged in particular between these two lateral openings). The two droplet separators are in this case preferably respectively arranged in front of an assigned lateral opening, so that the medium is constrained to pass through the two droplet separators. The openings and droplet separators are preferably arranged mirror-invertedly in relation to one another with respect to a vertical plane that runs through the cylinder axis.

The advantage of this feeding into the interior of the container is that droplets are already increased in size at this point by the droplet separators, and consequently can be better deposited for example on a separator lying thereabove. Furthermore, the droplet separators act with regard to the liquid phase of the medium or stream of substance as a liquid brake for the controlled downward run-off of liquid. It is however also possible to dispense with a droplet separator.

According to a preferred embodiment of the invention, it is also provided that the two droplet separators run in an inclined manner in relation to the vertical, the two droplet separators preferably respectively forming an acute angle with the baffle element, so that the two droplet separators diverge—starting from the baffle element. This inclined spatial position of the droplet separators has the effect that the flow-off area for the gaseous phase increases in size, so that an improved incident flow on the internals possibly lying thereabove results (for example the formation of a rolling surge can be reduced).

The droplet separators or meshes may also be formed such that they are lengthened in the downward direction beyond the flow-off areas or lateral openings (for example about 100 mm). Furthermore, the meshes or droplet separators may be provided with a peripheral, lateral covering, which preferably has respectively at the lower edge at least one drainage opening or is downwardly open, so that liquid can flow off in the downward direction. This allows bypass gas streams to be avoided and, when there are relatively great amounts of liquid, zones of stabilized gas flow to be created. When there are relatively small amounts of liquid, it is possible to dispense with such "drawing down" of the droplet separators or meshes and to provide one or more drainage openings at the baffle element under the respective droplet separator or mesh.

According to one embodiment of the invention, particularly preferably a channel is also respectively provided above the two first edge portions on the casing. These channels respectively extend parallel to the cylinder axis. it is preferably provided that, along the cylinder axis, the two channels respectively extend beyond the opening and/or the two droplet separators.

The two channels preferably establish a connection to the casing above the droplet separators, so that liquid that impinges on the tube portion from above can flow away into the channels, collect there and flow away over the ends of the channels downward into the container.

The provision of such channels is advantageous in particular when there are high liquid loads or when droplet separators are present (particularly in the form of knitted meshes). However, it is also possible to dispense with the channels, for example when there is predominantly a single-phase gas stream or when a lamella separator provided above the tube portion.

It is preferably provided in this case that the first directing element or elements run parallel to those walls and between those walls and also in particular perpendicularly in relation to the baffle element. The walls therefore outwardly delimit the outer segments in the direction of the cylinder axis.

According to a preferred embodiment of the invention, also provided in the interior of the pipeline portion are one, two or more plate-shaped second directing elements, which respectively extend two-dimensionally along a horizontal plane of extent and in this case are preferably arranged one over the other.

According to a further embodiment, provided in the interior of the pipeline portion as an alternative or in addition to this are one, two or more plate-shaped second directing elements, which respectively extend two-dimensionally along a vertical plane of extent and parallel to the cylinder axis.

In both embodiments, the first and second directing elements, which are preferably respectively formed as directing plates, are preferably configured such that the stream of substance entering the pipeline portion is divided between the individual segments of the opening or the baffle element. The directing elements therefore provide various flow paths, which lead to the individual segments.

BRIEF DESCRIPTION OF THE DRAWINGS

Further advantages and features of the invention are to be explained in the following description of figures of exemplary embodiments of the invention.

DETAILED DESCRIPTION OF THE INVENTION

Figure 1:
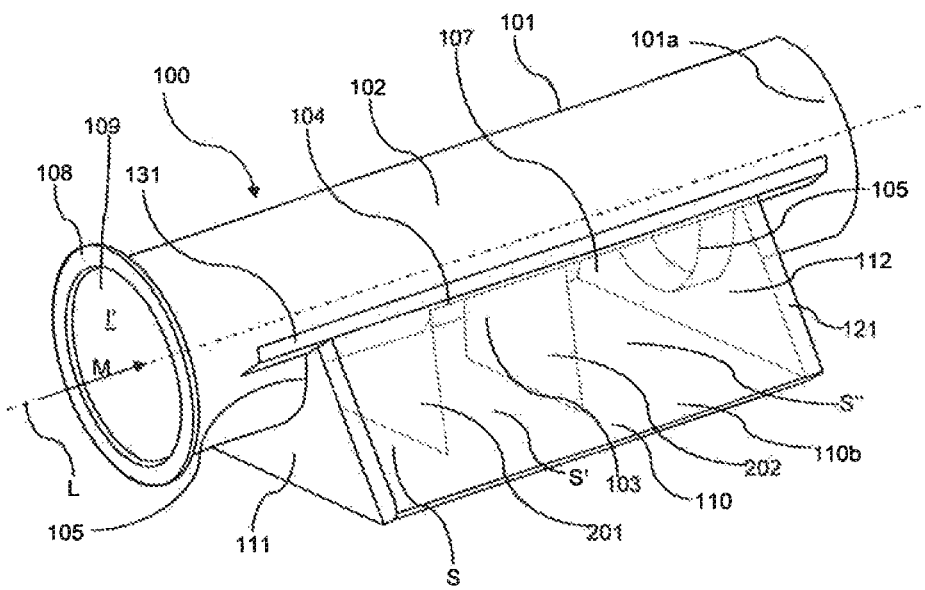
FIG. 1 shows a schematic, perspective view of a device according to invention.
Figure 2:
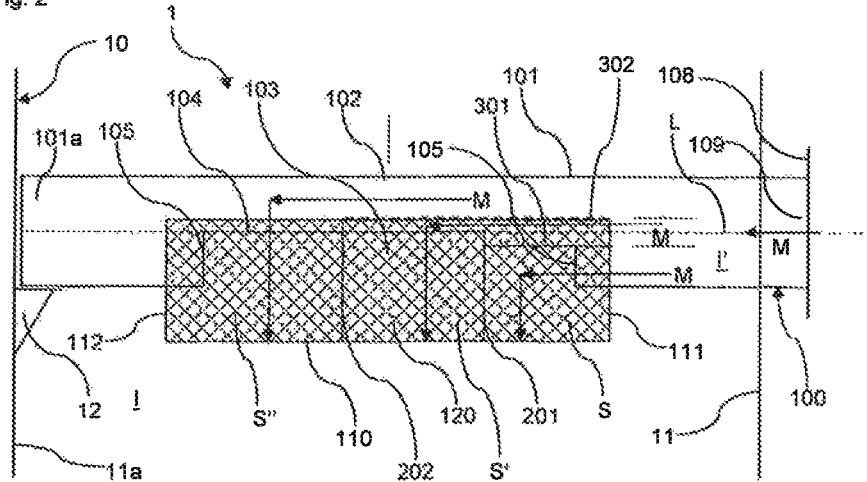
FIG. 2 shows a schematic side view of the device according to FIG 1.
Figure 3:
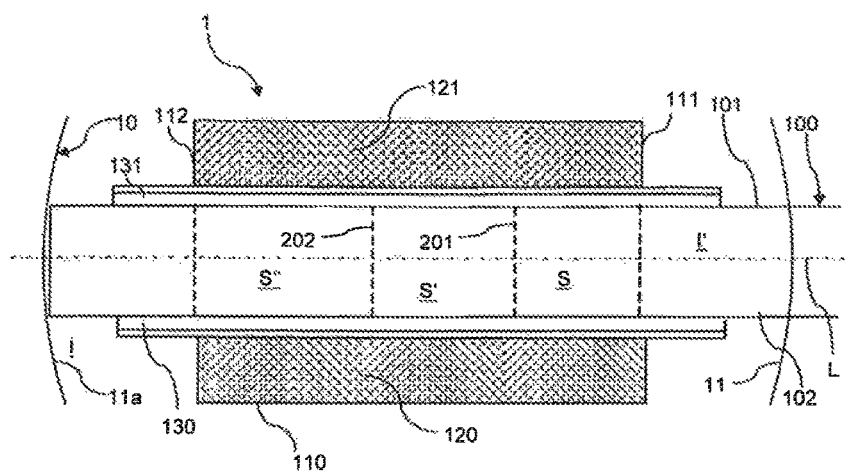
FIG. 3 shows a schematic plan view of the device according to FIGS. 1 and 2.
Figure 4:
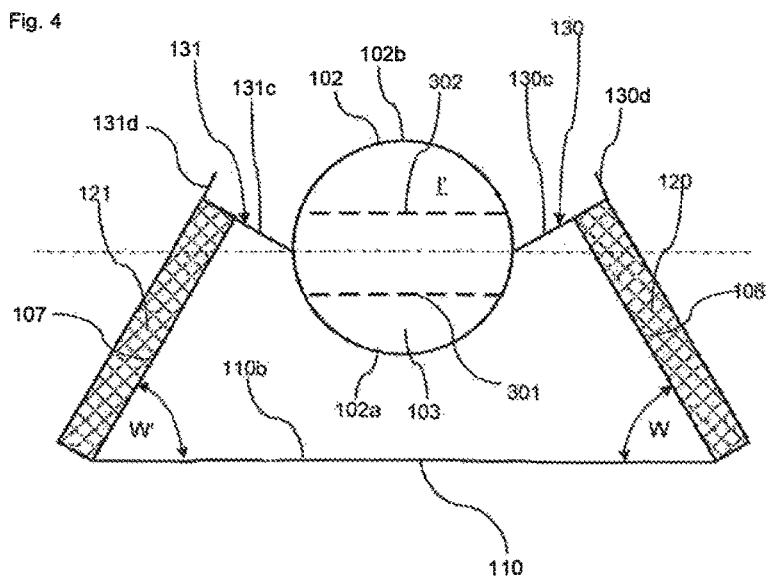
FIG. 4 shows a schematic front view of the device according to FIGS. 1 to 3.

FIG. 1 shows in conjunction with FIGS. 2 to 4 a device 1 according to the invention for introducing a fluid medium M into a container 10. The container 10 has a casing 11, which delimits an interior I of the container 10, the casing 11 having an inner side 11a facing the interior I. The container 10 may be an upright container 10, the longitudinal or cylinder axis of which is aligned along the vertical, or else however also be a lying container 10, the longitudinal or cylinder axis of which is aligned along the horizontal. For introducing the fluid medium M (for example in the form of a stream of a two-phase liquid-gaseous substance) into the interior I of the container 10, a pipeline 100 is provided, led with a pipeline portion 101 through the casing 11 into the interior I of the container 10. The free end 101a of the pipeline portion 101 in this case rests on a bearing 12, which is for example fixed to the inner side 11a of the container casing 11. Instead of the bearing 12, some other fastening/mounting of the pipeline portion 101 in or on the container 10 may be provided.

For connecting a further pipeline for supplying the fluid medium M, the pipeline 100 may have a flange 108. The flange 108 may in this case be arranged outside the container 10 or the interior I of the container 10. As an alternative to this, the flange 108 may also be arranged in the interior I of the container 10. The said further pipeline is then led into the interior I of the container 10 and connected there to the pipeline 100 or the pipeline portion 101.

The pipeline portion 101 has a hollow-cylindrical casing 102, which extends along a cylinder axis L, which runs parallel to the horizontal. The casing 102 delimits an interior, in particular a circular-cylindrical interior I', of the pipeline portion 101 and is covered fluid-tightly at the free end 101a of the pipeline portion 101 by a cover.

For flowing away of the fluid medium M into the interior I of the container 10, the casing 102 has on an underside 102a of the casing 102 facing downwardly along the vertical an opening 103, so that the upper side 102b of the casing 102 opposite from the opening 103 is formed as a half-tube or substantially as a half-tube. The opening angle or central angle of the opening 103 is therefore preferably 180°. The opening angle may however have values deviating from this or vary along the opening 103. The opening 103 is correspondingly delimited by two first, straight edge portions 104 of the casing 102, which run substantially parallel to the cylinder axis L, and also by two substantially semicircular second edge portions 105 of the casing 102, which respectively extend in a plane oriented transversely in relation to the cylinder axis L and connect the two first edge portions 104 to one another. The first edge portions 104 may also possibly have one or more steps.

For protecting a liquid sump of the container 10 that is situated underneath the pipeline portion 101, provided underneath the opening 103 in the direction of the vertical is a planar, plate-shaped baffle element or baffle plate 110, fastened to the casing 102, so that fluid medium M emerging from the opening 103 flows against the baffle element 110 and therefore cannot act directly on the sump. In order to increase this effect, it is provided that, along the cylinder axis L along the horizontal, the baffle element 110 extends over the entire length of the opening 103 and, perpendicularly to the cylinder axis L, extends beyond the opening 103 or the casing 102.

For fixing the baffle element 110 lying in a horizontal plane, two walls 111, 112 are provided, lying opposite one another in the direction of the cylinder axis, made to extend parallel to one another, projecting from the casing 102 and widening from the casing 102 in the direction of the baffle element 110. The two walls 111, 112 are connected, for example integrally or by some other connection (for example a welded connection), respectively to an edge region of the baffle element 110, so that the baffle element 110 lies opposite the opening 103 at a distance from the opening 103 in the direction of the vertical.

For collecting a liquid phase flowing down onto the pipeline portion 101 from above, also respectively provided above the two edge portions 104 of the casing 102 or the opening 103 is a channel 130, 131, which, parallel to the cylinder axis L, respectively extends beyond the opening 103. The respective channel may for example have a base 130c, 131c, which projects from the casing and from which there extends a side wall 130d, 131d.

The walls 111, 112, the baffle element 110 and the two channels 130, 131 respectively delimit on both sides of the pipeline portion 101 a lateral opening 106, 107, in front of which there is respectively arranged, preferably over the full surface area, a droplet separator 120, 121, so that, after deflection by the baffle element 110, the medium M emerging from the opening 103 is constrained to pass through those lateral openings 106, 107 or droplet separators 120, 121. The droplet separators 120, 121 are preferably knitted wire meshes. As can be seen in particular from FIG. 4, the two droplet separators 120, 121 preferably run in an inclined manner in relation to the vertical, so that they respectively form an acute angle W and W' with the planar baffle element 110. However, it is also possible in the case of the embodiment according to FIG. 1 to dispense with those droplet separators 120, 121.

It is also provided that the opening 103 or the baffle element 110 is divided into three segments S, S' and S''. For this purpose, two plate-shaped first directing elements or directing plates 201, 202 are provided for guiding the fluid medium M, respectively extend perpendicularly in relation to the cylinder axis L and proceed from an upper side 110b of the baffle element 110 that is facing the opening 103 and project through the opening 103 into the interior I' of the pipeline portion 101 or into that opening 103. In this case, the first directing elements 201, 202 run between the two walls 111, 112, to be precise parallel to them.

According to the exemplary embodiment shown in FIGS. 1 to 4, it is provided that the first directing elements 201, 202 form together with two plate-shaped second directing elements 301, 302, which run one over the other and horizontally in the interior I' of the pipeline portion 101, three flow paths, each of which leads to a segment S, S', S''. The stream of substance M can consequently be distributed between the three segments S, S', S''. The flow paths are preferably designed such that the medium M is delivered as uniformly as possible onto the baffle element 110.

Figure 5:
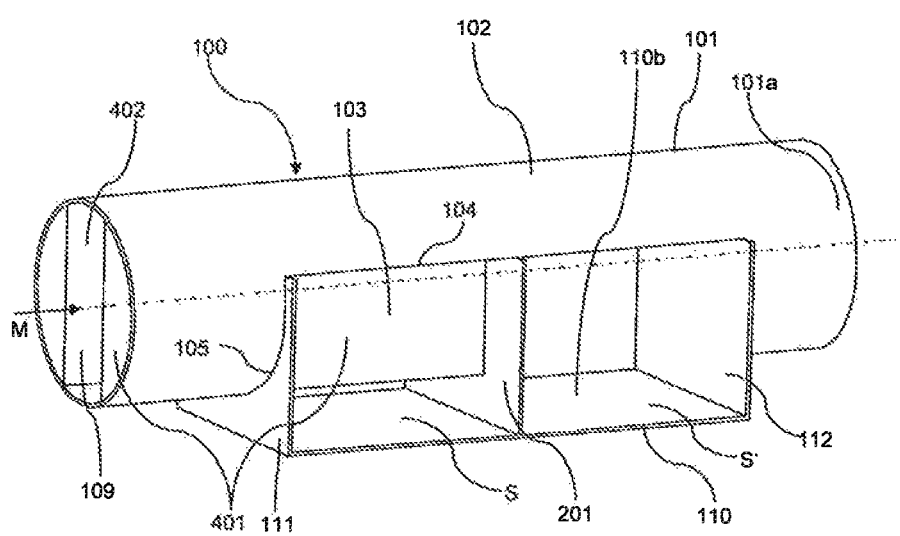
FIG. 5 shows a schematic, perspective view of a further device according to the invention.

FIG. 5 shows a further embodiment of a device 1 according to the invention, in which, as a difference from FIGS. 1 to 4, no droplet separators 120, 121 and channels 130, 131 are provided (though droplet separators and channels, which may be formed and arranged as described above, may also be provided here). Furthermore, as a difference from FIGS. 1 to 4, the two walls 111, 112 do not widen in the downward direction, i.e. toward the baffle element 110, but have parallel vertical edge portions. Furthermore, only a first directing element 201 is provided, running parallel to the walls 111, 112 and arranged centrally between them (and also perpendicularly in relation to the baffle element 110), so that the baffle element 110 or the half-tube-shaped opening 103 is divided into two segments S, S' of the same size. Instead of horizontal second directing elements or directing plates 301, 302, as in FIGS. 1 to 4, according to FIG. 5 two parallel plate-shaped directing elements 401, 402 are provided in the interior I of the pipeline portion 101, made to extend along the cylinder axis L and respectively extending along a vertical plane of extent. The two second directing elements 401, 402, lying horizontally next to one another, in this case extend along the cylinder axis L from an inlet opening 109 of the pipeline 100 to the first directing element 201, which projects into the opening 103 and which it meets at right angles. Created in this way are two lateral flow paths, which lead into a first segment S of the baffle element 110, situated closer to the inlet opening 109, and also a middle flow path between the two second directing elements 401, 402, which leads into the neighboring second segment S' of the baffle element 110.

LIST OF DESIGNATIONS

| | |
|---|---|
| 1 | Device |
| 10 | Container (for example separator, column, etc.) |
| 11 | Container casing |
| 11a | Inner side of container |
| 12 | Bearing |
| 100 | Pipeline |
| 101 | Pipeline portion |

| | |
|---|---|
| 101a | End |
| 102 | Casing |
| 102a | Underside |
| 102b | Upper side |
| 103 | Opening |
| 104 | First edge portions |
| 105 | Second edge portions |
| 106, 107 | Lateral opening |
| 108 | Flange |
| 109 | Inlet opening |
| 110 | Baffle element |
| 110b | Upper side |
| 111, 112 | Walls |
| 120, 121 | Droplet separators |
| 130, 131 | Channels |
| 201, 202 | First directing elements |
| 301, 302, 401, 402 | Second directing elements |
| W, W' | Angle |
| M | Stream of substance/medium |
| L | Cylinder axis |
| S, S', S" | Segments |
| I, I' | Interior |

The invention claimed is:

1. A device for introducing a fluid medium into a container, comprising:
 a container for receiving the medium,
 a pipeline for introducing the medium into an interior of the container, the pipeline having a pipeline portion, which is arranged in the interior of the container, and having a hollow-cylindrical casing, which extends along a cylinder axis of the pipeline portion,
 the casing having on a downwardly facing underside an opening for introducing the fluid medium into the interior of the container,
 the opening having two first edge portions that extend along the cylinder axis and two arcuate second edge portions that lie opposite one another, the arcuate second edge portions connecting the two first edge portions to one another,
 a plate-shaped baffle element that is fixed to the casing being arranged underneath the opening, so that fluid medium emerging from the opening strikes the baffle element,
characterized
in that at least one plate-shaped first directing element for guiding the fluid medium is provided, the at least one first directing element extending perpendicularly to the cylinder axis and proceeding from an upper side of the baffle element that is facing the opening and projecting through that opening into the interior of the pipeline portion.

2. The device as claimed in claim 1, characterized in that the two first edge portions run at least in certain portions or entirely parallel to the cylinder axis.

3. The device as claimed in claim 1, characterized in that the two second edge portions are formed as arcs of a circle.

4. The device as claimed in claim 1, characterized in that the cylinder axis runs parallel to the horizontal.

5. The device as claimed in claim 1, characterized in that, along the horizontal, the baffle element projects beyond the opening or the casing.

6. The device as claimed in claim 1, characterized in that the baffle element is fixed to the casing by way of at least two walls, which project from the underside of the casing.

7. The device as claimed in claim 1, characterized in that two droplet separators are provided in the opening one on each side of the pipeline portion.

8. The device as claimed in claim 7, characterized in that the two droplet separators run in an inclined manner in relation to the vertical, the two droplet separators forming an acute angle with the baffle element.

9. The device as claimed in claim 1, characterized in that, for collecting a liquid phase flowing down onto the pipeline portion from above, two channels are provided one above each of the two first edge portions on the casing the channels extending along the cylinder axis.

10. The device as claimed in claim 9, characterized in that the two channels extend beyond the opening or beyond the two droplet separators.

11. The device as claimed in claim 6, characterized in that the at least one first directing element runs parallel to the at least two walls by way of which the baffle element is fixed to the casing.

12. The device as claimed in claim 1, characterized in that provided in the interior of the pipeline portion for guiding the fluid medium is at least one plate-shaped second directing element, which lies in a horizontal plane.

13. The device as claimed in claim 1, characterized in that provided in the interior of the pipeline portion for guiding the fluid medium is at least one plate-shaped second directing element, which lies in a vertical plane and are arranged parallel to the cylinder axis.

14. The device as claimed in claim 1, characterized in that the device includes two or more plate-shaped first directing elements.

15. The device as claimed in claim 3, characterized in that the two second edge portions are formed as arcs of a semicircle.

16. The device as claimed in claim 7, characterized in that the droplet separators are formed of a knitted mesh.

17. The device as claimed in claim 12, characterized in that the device includes two or more plate-shaped second directing elements.

18. The device as claimed in claim 13, characterized in that the device includes two or more plate-shaped second directing elements.

* * * * *